July 5, 1932.  E. H. COQUILLE  1,866,013
TRUNK AND WHEEL CARRIER
Filed Sept. 4, 1928   2 Sheets-Sheet 2
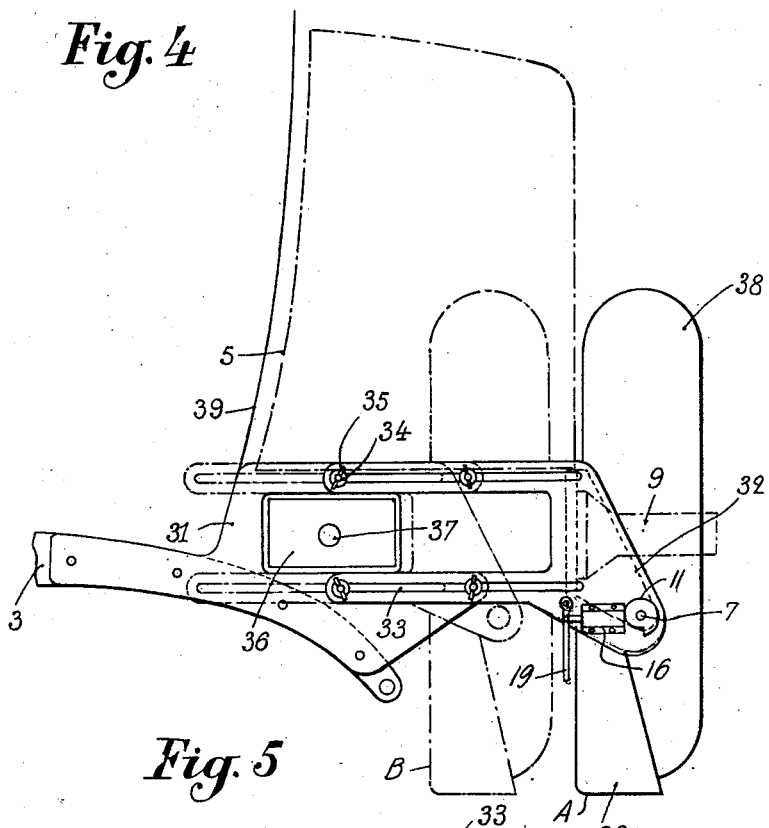
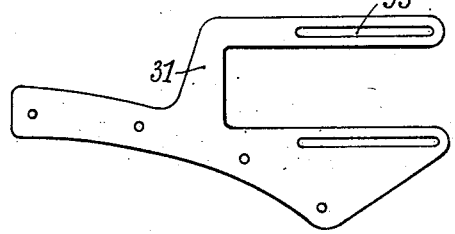
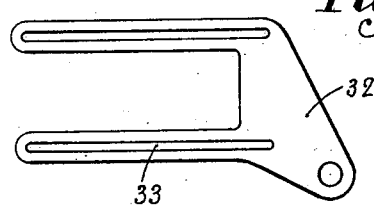

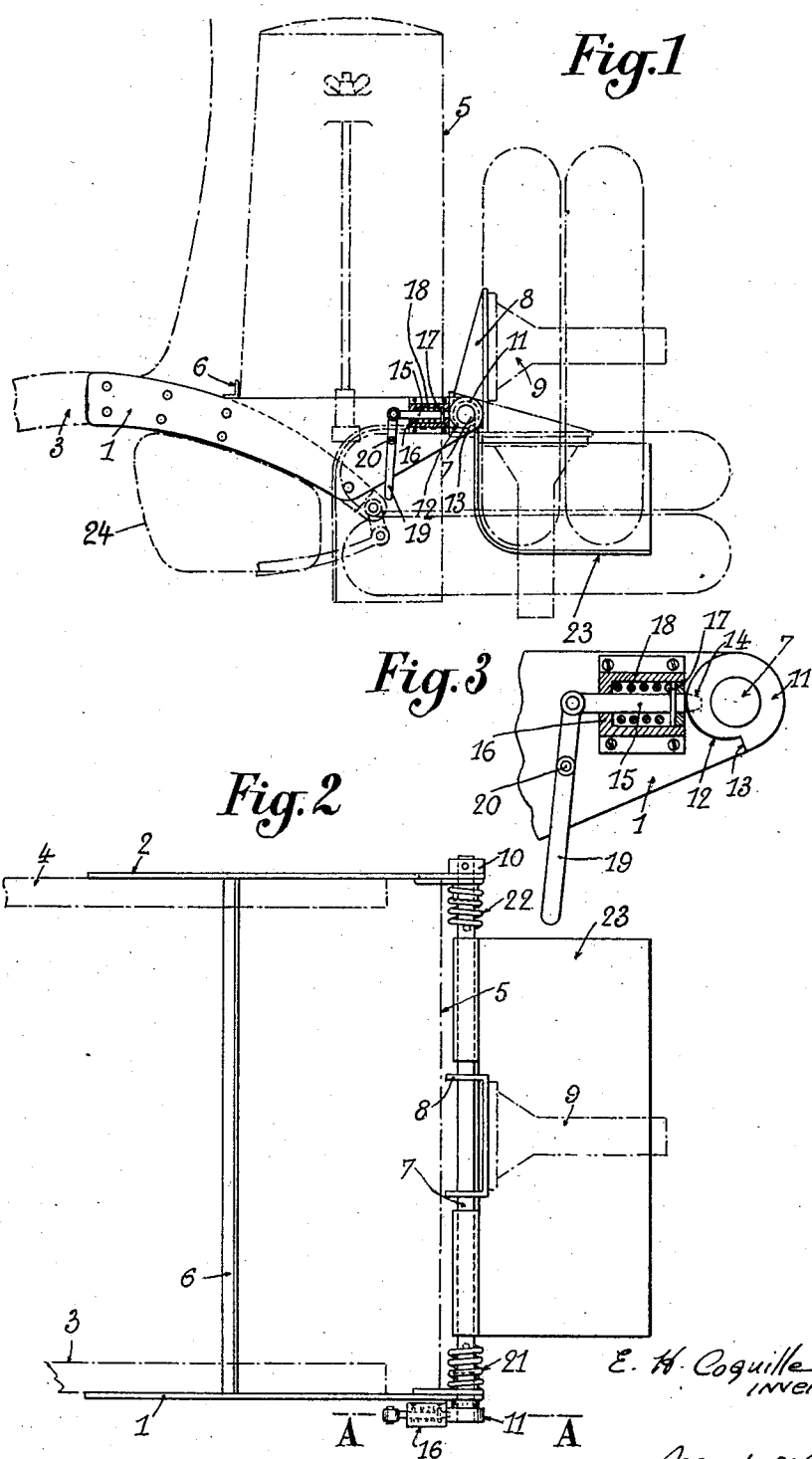

Patented July 5, 1932

1,866,013

UNITED STATES PATENT OFFICE

EMILE HENRI COQUILLE, OF PARIS, FRANCE, ASSIGNOR TO SOCIETE ANONYME DES USINES CHAUSSON, OF ASNIERES, SEINE, FRANCE

TRUNK AND WHEEL CARRIER

Application filed September 4, 1928, Serial No. 303,782, and in France September 17, 1927.

The present invention relates to a device for supporting trunks and spare wheel carriers upon motor vehicles.

According to a feature of the invention, said device comprises two metal brackets, which may consist of flat iron, for instance, which are adapted to support a fixed or removable trunk, chest or the like; said brackets are mounted at one end upon the longitudinals of the vehicle frame, and at their other ends, is rotatably supported a crossshaft, upon which is secured a spare wheel carrier, by any suitable means. Said device further comprises locking means for holding said cross shaft, and hence said carrier in its upward position.

Further features of the invention will be set forth in the following description, with reference to the accompanying drawings which are given solely by way of example.

Fig. 1 is an elevational view of the device, with a partial vertical section through the fastening device, on the line A—A of Fig. 2.

Fig. 2 is the corresponding plan view.

Fig. 3 is a vertical section, on a larger scale, on the line A—A of Fig. 2.

Fig. 4 is a view similar to Fig. 1 showing a modification.

Fig. 5 is an elevational view of one of the stationary metal brackets.

Fig. 6 is an elevational view of one of the two movable brackets.

In the form of construction herein represented, the device comprises two parallel iron brackets 1 and 2 formed, for instance, of two pieces of flat iron. Said brackets are secured to the rear part of the longitudinals of the vehicle, 3 and 4, inside or outside of said longitudinals, and are adapted to support a fixed or removable chest or trunk 5; each bracket comprises a horizontal part, at one end of which (for instance at the end which is adjacent the vehicle body) may be mounted a tappet or preferably an angle iron member 6, for limiting the position of said trunk towards the vehicle body. The two brackets are cross-connected at the rear by a shaft 7, on which is secured by soldering or welding, or by like means, a support 8 which is stamped, for instance, in a U shape. Said support is adapted to receive the spindle 9 carrying the spare wheels. Said support 8 may be pivoted, since shaft 7 is rotatably mounted on the supporting brackets.

Said shaft is provided at its end adjacent bracket 2 with appropriate stopping means, such as washer 10, and at its other end with a cam 11, which is rigidly secured thereto. Said cam is provided with an eccentric ramp 12, having at one end a stop 13 and at the other end a recess 14, which the end of catch 15 is adapted to engage. Said catch is slidably mounted in a case 16, which may be secured to the outside of bracket 1, and comprises a shoulder 17, upon which bears a coiled spring 18 located within said case. The catch may be controlled by a handle, or preferably by a lever 19 which is pivoted at 20. The device further comprises two springs 21 and 22, the ends of which are respectively secured to the rocking shaft 7 and to the corresponding brackets 1 and 2. A concave mud-guard 23 is secured to the rocking carrier 8.

The operation of the device is as follows:

In order to have access to the chest or trunk, the spare wheel carrier must be turned down, and for this purpose, the catch 15 is released, for instance (as shown in Fig. 1) by means of the lever 19. Due to the weight of the wheels, support 8 is urged down, shaft 7 is rotated, and stop 13 of cam 11 thus engages catch 15. To place again the whole device in its first position, the spare wheel carrier is rotated upwards until catch 15 automatically engages the recess 14 of cam 11. The compensating springs 21—22 will absorb the major part of the torque due to the overhang position of the spare wheels, and the pivoting motion is thus facilitated.

The brackets 1 and 2 may have any suitable length, which however will be selected, so as to prevent the rocking carrier to engage the gasoline tank 24, in case said tank is mounted at the rear of the chassis of the vehicle.

Figs. 4 to 6 show a modified construction of the device, in which the position of the spare wheel-carrier may be adjusted according to the position and the size of the trunk when the latter is placed at the rear of the vehicle.

In Figs. 4 and 5, 31 indicates two brackets which are permanently secured to the longitudinals 3 of the vehicle frame; upon these brackets are slidably secured two respective members 32 (Figs. 4 and 6) supporting the rotatably mounted shaft 7, to which is secured the spindle 9, carrying the spare wheel 38 and the mud-guard 23.

Brackets 31 and 32 have preferably a forked shape, as herein represented. In each arm of the forks is formed a longitudinal slot 33, whereby the movable brackets 32 may be held in any position on the fixed brackets 31 by bolts 34 or the like, and in order to facilitate this connection, said bolts may be provided with wing nuts or the like 35.

The device comprises a drawer 36 provided with a knob 37, and which may be adapted to contain tools or the like and the shape of the brackets 31—32 is such that said drawer may be used, irrespectively of the position of the spare wheel carrier.

The operation is as follows:

The device being in the position A shown in full lines, the space between wheel 38 and the vehicle body 39 will allow the insertion of a chest or a trunk 5; the access to said tool drawer 36 is toward the side of the vehicle, and the trunk may be opened at the rear, after the spare wheel carrier has been turned down.

If said trunk is not to be used, it may be removed, and after releasing of nuts 35, the spare wheel carrier is brought near the vehicle body 39, into the position B, shown in dot-and-dash lines on Fig. 4. Nuts 35 are then screwed again. The overhang of the spare wheel carrier is thus reduced. The spare wheel can no longer be turned down, but this movement is no longer required, since the trunk has been removed and the tool drawer 36 can be used in the same way as before.

Obviously, the invention is not limited to the details of construction herein described and represented which are given solely by way of example. For instance, the spare wheel carrier, which may be formed by forging, stamping, moulding or other process, may comprise means for holding wheels of all kinds, irrespectively of the manner they are to be secured to said carrier. The two brackets may have the shape of angle iron pieces, and they may be secured outwardly, with respect to the longitudinals, or to the top surface of the same, and such angle piece will be used to limit the side motion of the trunk. This latter may be secured by any suitable means, comprising for instance an elastic member for absorbing the vibrations.

Having now described my invention, what I claim as new and desire to secure by Letters Patent is:

1. A device for supporting trunks and spare wheels upon a motor vehicle, comprising trunk supporting brackets secured to the longitudinals of said motor vehicle, a cross shaft rotatably supported by the outer ends of said brackets, a spare wheel carrier rigidly secured to said shaft, locking means adapted to cooperate with said shaft and to hold said spare wheel carrier in its upward position, and yielding means adapted to bring automatically said locking means into its operative position when said sparewheel carrier is brought from a lower position into its upward position.

2. A device, according to claim 1, wherein said locking means comprise a fastening catch secured to one of said brackets, a control member for said catch, a cam rigidly secured to the corresponding outer end of said cross shaft, a spring adapted to urge said catch on said cam, means on said cam engageable by said catch and adapted to stop the rotating movement of said shaft according to the upward position of said spare-wheel carrier, and means on said cam cooperating with said catch for limiting the downward rotation of said spare-wheel carrier.

3. A device for supporting trunks and spare wheels upon a motor vehicle, comprising a number of forked shape supporting brackets secured to the longitudinals of said vehicle, a tool box between the arms of said brackets, a number of forked shape supporting brackets slidably mounted on said first named brackets, means for interlocking said first and last named brackets, a cross shaft rotatably supported by the outer ends of said last named brackets, and a spare wheel carrier rigidly secured to said cross-shaft.

In testimony whereof I have signed my name to this specification.

EMILE HENRI COQUILLE.